May 19, 1936.  W. H. WALLACE  2,041,159
LEAF SPRING STRUCTURE
Filed June 27, 1935
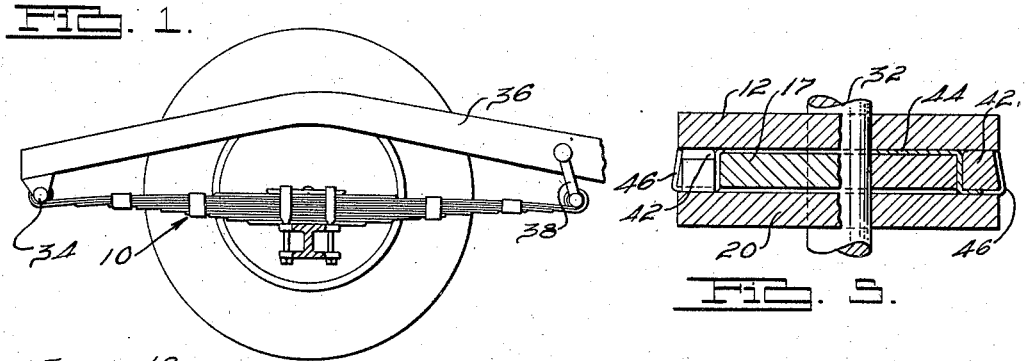
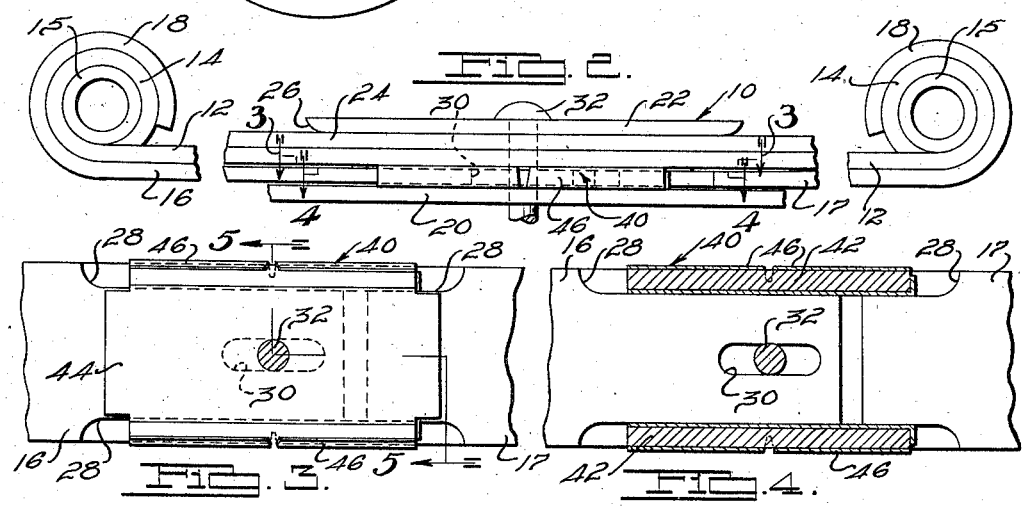
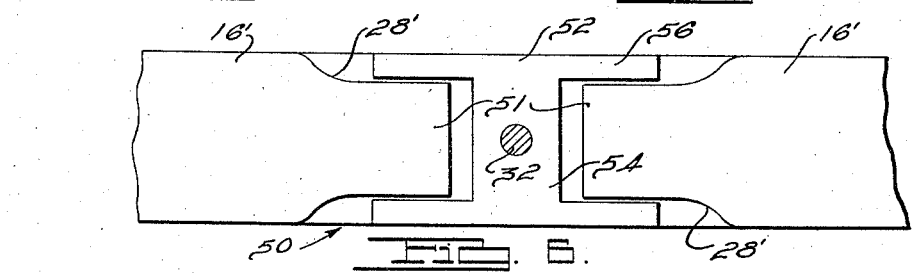
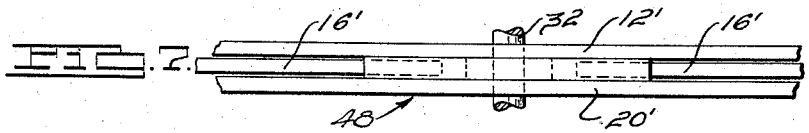
INVENTOR.
William H. Wallace.
BY Harness, Dickey,
Pierce & Hann.
ATTORNEYS.

UNITED STATES PATENT OFFICE 2,041,159

LEAF SPRING STRUCTURE

William H. Wallace, Detroit, Mich., assignor to Eaton Manufacturing Company, a corporation of Ohio Application June 27, 1935, Serial No. 28,663

16 Claims. (Cl. 267—47)

This invention relates to improved leaf springs.

More particularly the invention pertains to springs of this character for supporting the sprung portion of a vehicle upon the unsprung portion thereof.

Conventional leaf springs usually comprise a plurality of super-imposed and nested supporting leaves disposed adjacent a main leaf member having eyes at its opposite end portions by which it is pivoted and/or shackled to parts of the structure with which it is associated. The parts of the pivots or shackles are generally journalled in bushings fitted within the eyes of the main leaf and held against turning by the prehensile action thereof. The thickness of the main leaf, which mainly influences the flexure properties of the spring, particularly within initial limits of deflection thereof, must be sufficient to facilitate holding of the bushings against turning in their respective eyes, unwrapping of the latter and buckling of the main leaf when the spring is subjected to normal load. The thickness of the main leaf must also be predetermined to sustain the maximum permissible stress to which the spring is subjected.

Frequently the minimum permissible thickness of the main leaf required to provide the foregoing and other essential properties will not afford the flexure characteristics required in a particular installation. One of the main objects of the invention is to provide a spring which is freely flexible with respect to applied load and which has all of the foregoing and other essential properties of a leaf spring.

Another object of the invention is to provide a spring of this character which is more flexible than conventional leaf springs of equivalent load sustaining capacity and having main leaves of minimum permissible cross sectional dimensions.

A still further object of the invention is to provide a composite main leaf unit in a leaf spring of this character which has a flexure characteristic determining, long leaf section extending from end to end of the spring and having cross sectional dimensions less than those required to afford the other essential properties of the main leaf of the spring, and which is provided with spaced end leaf sections, each having an eye substantially concentric with and in reinforcing relationship with respect to one of the eyes of the long leaf section.

An additional object of the invention is to provide reinforcing leaf sections in a composite main leaf unit which supply those required structural and other properties that are lacking in a freely flexible main leaf section of insufficient cross sectional dimension, without reducing the flexibility of the leaf spring to that of leaf springs having a single piece main leaf of equivalent load sustaining capacity.

A further object of the invention is to provide spaced end leaf sections in a composite main leaf which have adjacent end portions slidably confined between the long leaf section and the adjacent supporting leaf of the spring.

Other objects of the invention are to provide a spacing member at the central portion of the spring between the long section of the main leaf assembly and the adjacent supporting leaf for providing sufficient clearance therebetween to accommodate relative free shifting of the inner end portions of the end sections during normal spring action; to provide means of this kind which also holds the inner end portions of the end leaf sections against lateral displacement; to provide spacing means of this character which has a wear resisting plate disposed between the end sections of the main leaf unit and the adjacent surface of the long section of the latter so as to prevent the long section of the main leaf unit from being scored and worn by the movement of the inner extremities of the end leaf sections; to provide a wear resisting plate of this kind which also serves to retain spacing elements by which the sliding clearance for the end leaf sections is maintained, in assembled relation, adjacent edge portions of the end leaf section so as to retain the latter against lateral displacement.

Still further objects of the invention are to provide means for limiting the longitudinal displacement of one of the end leaf sections of a composite main leaf unit from the leaf spring in event of failure of the associated end portion of the long leaf section; to provide means of this character which will prevent collapsing of the leaf upon the occurrence of such failure; and to provide safety means of this kind, preferably to cooperate with that end leaf section which is pivotally attached, rather than connected by a shackle, to the structure with which the leaf spring is associated.

Another object of the invention is to provide a composite main leaf unit of this character having eyes extending in respectively opposite directions from the sides of the long leaf section, the eye of the long leaf section being disposed within the eye of the associated end leaf unit at the pivotally attached end of the spring.

The present application is directed primarily to the combination between the improved spring clip and the spring with which it is used. In a divisional case of this application, Serial No. 47,020, filed October 28, 1935, the detailed construction of the spring clip per se is described and claimed.

The above being among the objects of the present invention, the same consists in certain novel features of constructions and combinations of parts to be hereinafter described with reference to the accompanying drawing and then claimed having the above and other objects in view.

Illustrative embodiments of the invention are shown in the accompanying drawing, in which:

Figure 1 is an elevational view showing a leaf spring, embodying the invention, interposed in weight supporting relation between the sprung portion of a vehicle and an unsprung portion thereof;

Fig. 2 is an enlarged, fragmentary elevational view of the leaf spring illustrated in Fig. 1;

Fig. 3 is a fragmentary, horizontal sectional view taken on the line 3—3 of Fig. 2;

Fig. 4 is a fragmentary, horizontal sectional view taken on the line 4—4 of Fig. 2;

Fig. 5 is a transverse vertical, sectional view taken on the line 5—5 of Fig. 3;

Fig. 6 is a fragmentary, horizontal sectional view of a leaf spring embodying a modified form of the invention;

Fig. 7 is a fragmentary side elevational view of the leaf spring shown in Fig. 6;

Fig. 8 is a fragmentary side elevational view, similar to Fig. 2, but showing a composite main leaf unit embodying a further development of the invention.

In the form of the invention illustrated in Figs. 1 to 5, inclusive, the leaf spring, generally designated by the numeral 10, includes a composite main leaf comprising a long leaf section 12 which extends from end to end of the leaf spring and which is provided at its longitudinal extremities with eyes 14. A pair of end leaf sections 16 and 17 are arranged adjacent the opposite end portions of the long leaf section 12 and provided with eyes 18 which are disposed substantially in concentric relation with respect to and externally of the eyes 14 of the long leaf section 12. The inner or adjacent end portions of the end leaf sections 16 and 17 are slidably disposed between the intermediate portions of the long leaf section 12 and an adjacent supporting or reinforcing leaf 20. Any required number of superimposed and nested supporting or reinforcing leaves 20 may be employed depending upon the characteristics desired of the resulting leaf spring. In the spring illustrated in the drawing, a rebound plate 22 is located above the long leaf section of the composite main leaf and a reinforcing leaf 24 is disposed between the rebound plate 22 and the long leaf section 12. The rebound plate 22 is preferably provided with rounded extremities 26. The shape and construction of the rebound plate 22 and associated reinforcing leaf 24 may be predetermined to meet the requirements for which the spring is designed and if desired these parts of the leaf spring may be omitted.

The left end leaf section 16, as viewed in Figs. 2, 3 and 4, is slightly longer than the right end leaf section 17 and it extends beyond the center of the leaf spring. The adjacent end portions of the end leaf section 12 are reduced in width as illustrated in Fig. 3, so as to provide recesses 28 along the longitudinal edges of the adjacent ends thereof. Formed in the reduced end portion of the left end leaf section 16 is an elongated aperture 30 which registers with smaller apertures in the rebound plate 22, reinforcing leaf 24, supporting leaves 20 and long leaf section 12 of the composite main leaf structure. Extending through these registering apertures is a tie bolt 32 by which the central portions of the various leaves of the spring are fixed together. The elongated apertures 30 of the left end leaf section 16 of the composite main leaf accommodate limited sliding of the inner end portion of this end leaf section with respect to the long leaf section 12 and with respect to the reinforcing and supporting leaves during normal flexure of the spring. In the event of failure of the long leaf section 12, longitudinal displacement of the associated end leaf section 16 is positively limited by the bolt 32 so as to prevent collapsing of the spring. Inasmuch as the pivoted end of the spring is subjected to more distortion than the shackled end thereof, it is preferable to pivotally attach that end of the leaf spring at which the longer end leaf section 16 is disposed to the sprung portion of the vehicle as illustrated at 34 in Fig. 1, the opposite end of the leaf spring 10 being connected with the sprung portion 36 of the vehicle by a shackle 38.

In order to provide relatively free sliding clearance for the inner adjacent end portions of the end leaf sections 16 and 17, a spacer member generally designated by the numeral 40, is disposed between the long leaf section 12 of the main leaf unit and the adjacent supporting or reinforcing leaf 20 thereof, as illustrated in Figs. 2, 3 and 4. The spacer member 40 includes a pair of spacing elements or bars 42 which are disposed in the recesses 28 adjacent the reduced end portions of the end leaf sections 16 and 17 and between the long leaf section 12 of the composite main leaf unit and the adjacent supporting leaf 20. These spacing elements 42 are held against lateral displacement by a sheet metal plate 44 having channels 46 along its longitudinal edges in which the spacing bars 42 are disposed. The intermediate portion of the plate 44 is located between the long leaf section 12 of the composite main leaf unit and the adjacent end portion of the end leaf sections 16 and 17 in order to provide a bearing surface which protects the long leaf section against wear, abrasion and scoring by the movement of the inner adjacent end portions of the end leaf sections relative thereto during normal spring operation. The combined thickness of the plate 44 and height of the spacing bars 42 is sufficiently greater than the thickness of the adjacent end portions of the end leaf section 16 to provide that clearance which is required to facilitate the relatively free sliding of the inner end portions of the end leaf section 16 relative to the supporting leaf 20 and the long leaf section 12.

In the form of the invention illustrated in Figs. 6 and 7 the composite main leaf, generally designated by the numeral 48, also includes a long leaf section 12' and a pair of end leaf sections 16' which are disposed in the same relation illustrated in the form of the invention shown in Figs. 1 to 5, inclusive, and which have concentrically arranged eyes on the long leaf sections and end leaf sections and disposed in reinforcing relationship. In this form of the invention, the end leaf sections 16' are of substantially equal length and they terminate short of the longitudinal center of the leaf spring. The inner end portions 51 of the end leaf section 16' are reduced somewhat in width to provide recesses 28' adjacent their longitudinal edge portions. An H-shaped spacing member 52 is disposed at the central portion of the leaf spring and provided with a transversely extending body part 54 which extends between the adjacent extremities of the end leaf sections 16', as illustrated in Fig. 6. The spacing member 52 has longitudinally extending side elements 56 which are arranged in the recesses 28' and engaged between the long leaf section 12' and an associated reinforcing leaf 20'. The spacing member 52 is slightly thicker than the adjacent end portions of the end leaf sections 16' so as to provide free sliding clearance between the long leaf section 12' of the main leaf unit and the reinforcing leaf 20'. The reduced end portions of the end leaf sections 16' slide freely between the side elements 56 of the spacing member 52 which is held against displacement with respect to the long leaf section 12 and reinforcing leaves 20' by a center tie bolt 32' extending through registering apertures in the leaves of the spring leaf and in the body portion 54 of the spacing member 52. The longitudinal side elements 56 hold the inner end portions of the end leaf sections 16' against lateral displacement and provide guideways within which the inner end portions thereof are slidable.

In the form of the invention illustrated in Fig. 8 the central portion of the leaf spring structure may be constructed in accordance with the embodiments of the invention illustrated in Figs. 1 to 5, inclusive, or in Figs. 6 and 7. In this form of the invention, the composite main leaf unit includes a long leaf section 58 having an upwardly extending eye 60 at its left extremity and an oppositely or downwardly extending eye 62 at its right extremity. An end leaf section 63 is provided at the left end of the spring adjacent the long leaf section 58. Formed on the end leaf section 63 is an eye 64 which is concentric with the eye 60 and located externally thereof. An end leaf section 66 is disposed adjacent the right end of the long leaf section 58 and provided with an eye 70 which is disposed within the eye 62 of the long leaf section 58. In a composite main leaf unit of this character the end of the spring which has the eye 60 of the long leaf section disposed within an eye of an end leaf section is preferably pivotally attached to the structure with which the spring is associated and the opposite end of the spring which has an end leaf section eye 70 disposed within the associated eye of the long leaf section is preferably pivotally connected to the structure by a shackle. Both of the eyes of the spring may be disposed upwardly or downwardly as desired, but in either case it is preferable to provide an internal long leaf section eye at that end of the spring which is pivotally attached to the structure with which the spring is used. This arrangement of the eyes may be predetermined by properly disposing the end leaf sections with respect to the long leaf section.

The eyes of both the long leaf section and the end leaf sections may be formed in any conventional manner but it is preferable to bring these eyes to their final shape and dimensions and then to assemble the various sections of the main leaf unit by bringing the internal eye of one leaf section into registration with the passage of the external eye of an associated section and then forcing the eyes together axially under pressure. The outer dimensions of the internal eyes are preferably slightly larger than the internal dimensions of the outer eyes so as to provide a press fit therebetween. The press fitting relationship between the eyes of the main leaf sections and the end leaf sections affords that reinforcement that is required to prevent turning of the bushings 15 with which spring eyes of this character are conventionally provided. The reinforcement afforded by the concentric eye structure also prevents unwrapping of the eyes during normal spring action.

The cross sectional dimensions of the main leaf structure are preferably so predetermined as to produce the desired flexure characteristics without necessarily maintaining sufficient cross sectional areas to independently withstand the maximum stress to which the main leaf structure is normally subjected under load deflection. The end leaf sections are then relied upon to add those structural properties which are sacrificed in order to obtain the desired flexure characteristics. Inasmuch as the inner end portions of the end leaf section of the composite main leaf units are free to slide relative to the long leaf section and associated reinforcing leaves, these end leaf sections do not impair the flexure characteristics to that extent which they would be modified by providing the required cross sectional dimensions in a single main leaf structure. In this manner, leaf springs having greater flexibility than conventional leaf springs of equivalent load sustaining capacity may be constructed and as a result the vehicles in which such springs are employed have a softer spring action and more satisfactory ride characteristics. This is accomplished without in any way sacrificing strength, stability or load carrying capacity or shortening the life of the leaf spring structure.

Formal changes may be made in the specific embodiment of the invention described without departing from the spirit and substance of the broad invention, the scope of which is commensurate with the appended claims.

What I claim is:

1. In a leaf spring having a reinforcing spring leaf; a composite main leaf unit comprising a long leaf section having an eye at each of its longitudinal extremities, a pair of spaced end leaf sections having outer extremities fixed in reinforcing relation to and against longitudinal movement with respect to said eyes and having inner end portions slidably disposed between said long leaf section and said reinforcing spring leaf, and means for accommodating limited longitudinal movement of an inner end portion of one end leaf section and positively limiting longitudinal displacement of said end leaf section from between said long leaf section and said reinforcing leaf.

2. In a leaf spring having a reinforcing spring leaf; a composite main leaf unit comprising a long leaf section having an eye at each of its longitudinal extremities, a pair of spaced end leaf sections having outer extremities fixed in reinforcing relation to and against longitudinal movement with respect to said eyes and having inner end portions slidably disposed between said long leaf section and said reinforcing spring leaf, and a bearing element between the inner end portions of said end leaf sections and said long leaf section for preventing wearing and scoring of said the latter by the extremities of said end leaf sections.

3. In a leaf spring having a reinforcing spring leaf; a composite main leaf unit comprising a long leaf section having an eye at each of its longitudinal extremities, a pair of spaced end leaf sections having outer extremities fixed in reinforcing relation to and against longitudinal movement with respect to said eyes and having inner end portions slidably disposed between said long leaf section and said reinforcing spring leaf, and means spacing the intermediate portions of said long leaf section and said reinforcing leaf apart to provide sliding clearance for the inner ends of said end leaf sections, said means including a bearing element between said the inner end portions of said end leaf sections and said long leaf section for preventing wearing and scoring of said the latter by the extremities of said end leaf sections.

4. In a leaf spring having a reinforcing spring leaf; a composite main leaf unit comprising a long leaf section having an eye at each of its longitudinal extremities, a pair of spaced end leaf sections having outer extremities fixed in reinforcing relation to and against longitudinal movement with respect to said eyes and having inner end portions slidably disposed between said long leaf section and said reinforcing spring leaf, and a spacing member between the intermediate portions of said reinforcing leaf and said long leaf section providing clearance therebetween for sliding movement of the inner end portions of said end leaf sections, said spacing member being provided with elements for holding the inner end portions of said end leaf sections against lateral displacement.

5. In a leaf spring having a reinforcing spring leaf; a composite main leaf unit comprising a long leaf section having an eye at each of its longitudinal extremities, a pair of spaced end leaf sections having outer extremities fixed in reinforcing relation to and against longitudinal movement with respect to said eyes and having inner end portions slidably disposed between said long leaf section and said reinforcing spring leaf, a spacing member between the intermediate portions of said reinforcing leaf and said long leaf section providing clearance therebetween for sliding movement of the inner end portions of said end leaf sections, said spacing member being provided with elements for holding the inner end portions of said end leaf sections against lateral displacement, and a tie bolt extending through apertures in and holding said long leaf section, reinforcing leaf and spacing member in assembled relation.

6. In a leaf spring having a reinforcing spring leaf; a composite main leaf unit comprising a long leaf section having an eye at each of its longitudinal extremities, a pair of spaced end leaf sections having outer extremities fixed in reinforcing relation to and against longitudinal movement with respect to said eyes and having inner end portions of reduced widths slidably disposed between said long leaf section and said reinforcing spring leaf, and means adjacent the reduced end portions of said end leaf sections providing clearance between said long leaf section and said reinforcing leaf for accommodating sliding of the inner ends of said end leaf sections and for holding the latter against lateral displacement.

7. In a leaf spring having a reinforcing spring leaf; a composite main leaf unit comprising a long leaf section having an eye at each of its longitudinal extremities, a pair of spaced end leaf sections having outer extremities fixed in reinforcing relation to and against longitudinal movement with respect to said eyes and having inner end portions provided with cut-away edge portions, and means including spacing elements disposed adjacent corresponding cut-away edge portions of said end leaf sections and disposed between said reinforcing leaf and said long leaf section for providing sliding clearance therebetween.

8. In a leaf spring having a reinforcing spring leaf; a composite main leaf unit comprising a long leaf section having anchoring means at each of its longitudinal extremities, a pair of spaced end leaf sections having outer extremities fixed in reinforcing relation to and against longitudinal movement with respect to said anchoring means and having inner end portions provided with cut-away edge portions, and means including spacing elements disposed adjacent corresponding cut-away edge portion of said end leaf sections and disposed between said reinforcing leaf and said long leaf section for providing sliding clearance therebetween, said means including a connection between said spacing elements for holding the latter and the inner ends of said end leaf sections against lateral displacement.

9. In a leaf spring having a reinforcing spring leaf; a composite main leaf unit comprising a long leaf section having anchoring means at each of its longitudinal extremities, a pair of spaced end leaf sections having outer extremities fixed in reinforcing relation to and against longitudinal movement with respect to said anchoring means and having inner end portions provided with cut-away edge portions, and means including spacing elements disposed adjacent corresponding cut-away edge portion of said end leaf sections and disposed between said reinforcing leaf and said long leaf section for providing sliding clearance therebetween, said means including a bearing member connecting said spacing elements together and disposed between the inner end portions of said end leaf sections and said long leaf section for protecting the latter from wearing.

10. A leaf spring including a reinforcing spring leaf, a composite main leaf unit comprising a long leaf section having an eye at each of its longitudinal extremities and a pair of spaced end leaf sections extending between said reinforcing leaf and said long leaf section, each having an eye substantially concentric and in reinforcing relationship with one of the eyes of said long leaf section respectively, and means for accommodating limited longitudinal movement of an inner end portion of one end leaf section and positively limiting longitudinal displacement of said end leaf section from between said long leaf section and said reinforcing leaf.

11. In combination with the sprung and unsprung portions of a vehicle, a leaf spring interposed in supporting relation therebetween and including a reinforcing leaf, a composite main leaf unit comprising a long leaf section having anchoring means at each of its longitudinal extremities and a pair of spaced end leaf sections extending between said reinforcing leaf and said long leaf section, each having anchoring means substantially concentric and in reinforcing relationship with one of the eyes of said long leaf section respectively, means pivotally securing one end of said main leaf unit to one of said vehicle portions, a shackle connecting the other end of said composite main leaf unit to said vehicle portion, and means associated with the inner end of the end leaf section of the pivotally attached end of said spring for accommodating limited movement of said inner end and positively holding the latter against unintended longitudinal displacement in the event of failure of the corresponding end of said long main leaf section.

12. A leaf spring including a reinforcing spring leaf, a main leaf section adjacent thereto having eyes formed on its opposite extremities, spaced end main leaf sections having inner end portions slidably disposed between said main leaf section and said reinforcing leaf, each having an eye in substantially concentric reinforcing relationship with an eye of said main leaf section, the adjacent ends of said end leaf sections being reduced in width, and a spacing member of greater thickness than the inner ends of said end leaf sections disposed between said main leaf section and said reinforcing leaf and having projecting elements extending adjacent the reduced portions of said end leaf sections for holding the latter against lateral displacement.

13. A leaf spring including a reinforcing spring leaf, a main leaf section adjacent thereto having eyes formed on its opposite extremities, spaced end main leaf sections having inner end portions slidably disposed between said main leaf section and said reinforcing leaf, each having an eye in substantially concentric reinforcing relationship with an eye of said main leaf section, the adjacent ends of said end leaf sections being reduced in width, spacing members of greater thickness than the inner ends of said end leaf sections disposed between said main leaf section and said reinforcing leaf and having projecting elements extending adjacent the reduced portions of said end leaf sections for holding the latter against lateral displacement, and means for tying said main leaf section, reinforcing leaf and said spacing member together.

14. In combination with the sprung and unsprung portions of a vehicle, a leaf spring interposed in supporting relation therebetween and including a reinforcing leaf, a composite main leaf unit comprising a long leaf section having an eye at each of its longitudinal extremities and a pair of spaced end leaf sections extending between said reinforcing leaf and said long leaf section, each having an eye substantially concentric and in reinforcing relationship with one of the eyes of said long leaf section respectively, means pivotally securing one end of said main leaf unit to one of said vehicle portions, and a shackle connecting the other end of said unit to said vehicle portion, the eyes of said long leaf section extending in opposite directions from the sides thereof and the eye of the pivotally attached end of said long leaf section being disposed within the eye of the associated end leaf section.

15. In a spring construction, a composite primary leaf comprising a long leaf section, and auxiliary sections lying closely adjacent thereto, said auxiliary sections having their outer ends anchored to said long leaf section, and a member engaging the inner ends of said auxiliary sections for guiding them during relative longitudinal movement.

16. In a spring construction, a composite primary leaf comprising a long leaf section, and auxiliary sections lying closely adjacent thereto, said auxiliary sections having their outer ends locked in engagement with said long leaf section, means engaging the inner ends of said auxiliary sections for guiding them during longitudinal movement, said means serving to prevent contact between the inner ends of said auxiliary members and the adjacent portion of said long leaf section.

WILLIAM H. WALLACE.